United States Patent [19]

Osato

[11] Patent Number: 5,370,945
[45] Date of Patent: Dec. 6, 1994

[54] MAGNETOOPTIC RECORDING MEDIUM

[75] Inventor: Yoichi Osato, Yokohama, Japan

[73] Assignee: Canon Kabushiki Kaisha, Tokyo, Japan

[21] Appl. No.: 915,601

[22] Filed: Jul. 21, 1992

[30] Foreign Application Priority Data

Jul. 22, 1991 [JP] Japan .................................. 3-181046

[51] Int. Cl.⁵ ........................ G11B 5/716; B32B 15/00
[52] U.S. Cl. ........................... 428/635; 428/694 MM; 428/928; 428/611; 428/670
[58] Field of Search ................ 428/611, 635, 694, 900, 428/928, 670, 668, 694 MM, 694 EC, 694 TM

[56] References Cited

U.S. PATENT DOCUMENTS

| | | | |
|---|---|---|---|
| 4,587,176 | 5/1986 | Carcia | 428/635 |
| 4,664,977 | 5/1987 | Osato et al. | 428/336 |
| 4,675,767 | 6/1987 | Osato et al. | 360/131 |
| 4,678,721 | 7/1987 | denBroeder et al. | 428/611 |
| 4,833,020 | 5/1989 | Shiroishi et al. | 428/611 |
| 4,837,118 | 6/1989 | Yamamoto et al. | 428/928 |
| 4,992,336 | 2/1991 | Yamamoto et al. | 428/635 |
| 5,019,462 | 5/1991 | Steininger et al. | 428/900 |
| 5,082,749 | 1/1992 | Carcia | 428/699 |
| 5,106,703 | 4/1992 | Carcia | 428/635 |
| 5,132,945 | 7/1992 | Osato et al. | 369/13 |

FOREIGN PATENT DOCUMENTS

| | | |
|---|---|---|
| 0253282 | 1/1988 | European Pat. Off. . |
| 0376375 | 4/1990 | European Pat. Off. . |
| 0367685 | 5/1990 | European Pat. Off. . |
| 0406569 | 1/1991 | European Pat. Off. . |
| 0492584 | 4/1992 | European Pat. Off. . |
| 198144 | 4/1989 | Japan . |
| 1162257 | 6/1989 | Japan . |
| 3134833 | 6/1991 | Japan . |
| 3157838 | 7/1991 | Japan . |
| 4053044 | 2/1992 | Japan . |

*Primary Examiner*—Benjamin R. Fuller
*Assistant Examiner*—Valerie Ann Lund
*Attorney, Agent, or Firm*—Fitzpatrick, Cella, Harper & Scinto

[57] ABSTRACT

A magnetooptic recording medium comprises a substrate and a recording layer which is provided on the substrate and is formed by periodically laminating a plurality of fundamental units. Each of the fundamental units comprises a first layer made of Co, a second layer made of a material selected from Pt, Pd, and Pt-Pd alloy, a third layer made of Co, and a fourth layer made of at least one kind of element selected from Ce, Pr, Nd, Pm, Sm, Eu, Gd, Tb, Dy, Ho, and Er.

12 Claims, 3 Drawing Sheets

MAGNETOOPTIC RECORDING MEDIUM

BACKGROUND OF THE INVENTION

1. Field of the Invention

The invention relates to a magnetooptic recording medium for recording and/or reproducing information by a laser beam or the like by utilizing a magneto-optical effect and, more particularly, to a magnetooptic recording medium of an artificial lattice film system having a good vertical magnetic anisotropy and a high coercive force.

2. Related Background Art

In recent years, as a rewritable high density recording method, a magnetooptic recording medium for performing recording and reproduction by a semiconductor laser beam or the like has been highlighted.

Hitherto, as a magnetic material which is used in the magnetooptic recording medium, there has been used an amorphous alloy comprising a combination of a rare earth element such as Gd, Tb, Dy, or the like and a transition metal element such as Fe, Co, or the like. However, there is a drawback in that the rare earth elements and Fe which construct the amorphous alloy are easily oxidized and corrosion easily occurs under a hot and humid environment.

On the other hand, a recording material of the Co-Pt system or Co-Pd system using a platinum group metal such as Pt, Pd, or the like in place of the rare earth element has excellent corrosion resistance. Techniques for raising the coercive force by using those systems as artificial lattice films are disclosed in JP-A-1-98144, JP-A-1-162257, and the like. According to those techniques, in a range of an extremely thin film thickness of about 200 Å, a coercive force of about 100 to 200 Oe is obtained in case of the artificial lattice film of the Co-Pt system and a coercive force of about 500 to 2000 Oe is obtained in case of the artificial lattice film of the Co-Pd system, so that vertical magnetic films are realized. The artificial lattice film is what is called a super lattice film or modulation structural film, and is a film in which a plurality of layers which are made of different components and have a thickness of several tens of atomic layers or less are regularly repetitively laminated so as to each have a predetermined thickness.

The conventional magnetooptic recording medium using the foregoing artificial lattice film as a recording layer has a problem in that the magnitude of the coercive force of the recording layer and the magnitude of the vertical magnetic anisotropy are still insufficient to stably execute a magnetooptic recording.

SUMMARY OF THE INVENTION

It is an object of the invention to solve the problems of the conventional techniques mentioned above and to provide a magnetooptic recording medium which has large enough coercive force and vertical magnetic anisotropy and which can be manufactured under wider film forming conditions.

The above object of the invention is accomplished by a magnetooptic recording medium comprising a substrate and a recording layer which is provided on the substrate and is formed by periodically laminating a plurality of fundamental units, wherein each of the fundamental units is constructed by: a first layer made of Co; a second layer made of a material selected from Pt, Pd, and Pt-Pd alloy; a third layer made of Co; and a fourth layer made of one or more kinds of elements selected from Ce, Pr, Nd, Pm, Sm, Eu, Gd, Tb, Dy, Ho, and Er.

DETAILED DESCRIPTION OF THE PREFERRED EMBODIMENTS

Figure 1:
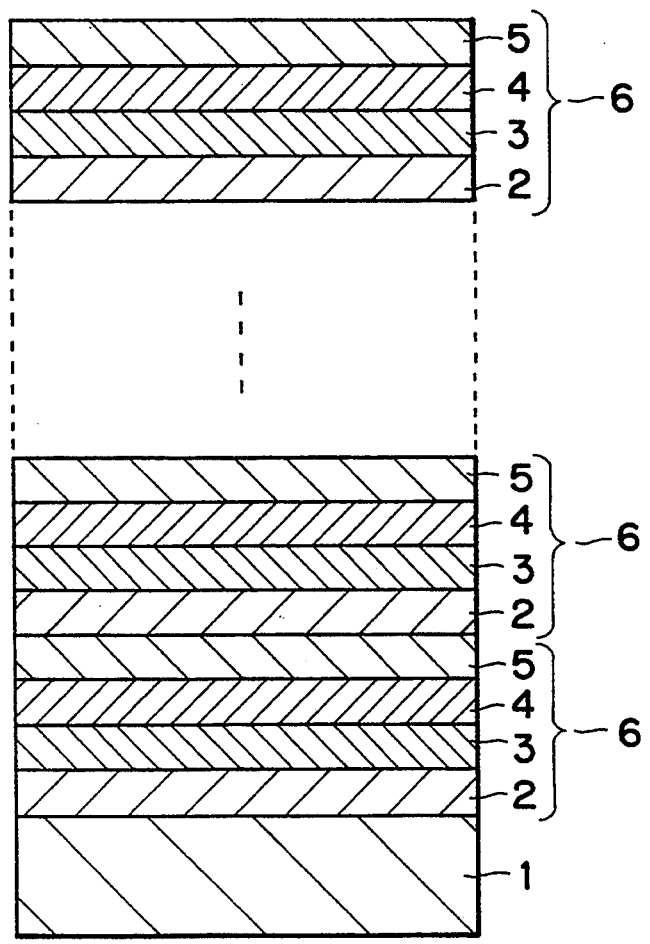
FIG. 1 is a schematic cross sectional view showing a first embodiment of a magnetooptic recording medium of the invention.

FIG. 1 is a cross sectional view of an example of a magnetooptic recording medium based on the invention. The magnetooptic recording medium shown here is constructed in a manner such that a fundamental unit 6 is formed by sequentially laminating a first Co layer 2 made of Co, a platinum group layer 3 made of a metal selected from Pt, Pd, and Pt-Pd alloy, a second Co layer 4 made of Co, and a rare earth layer 5, an artificial lattice film is formed by repetitively regularly laminating such a fundamental unit 6 a number of times, and the artificial lattice film is used as a recording layer. The recording layer is provided on a substrate 1 made of a glass, plastics, or the like. The rare earth layer 5 is made of at least one or more kinds of elements selected from Ce, Pr, Nd, Pm, Sm, Eu, Gd, Tb, Dy, Ho, and Er.

It is now desirable to set thicknesses of first and second Co layers 2 and 4 to values of about 2 to 30 Å, to set a thickness of platinum group layer 3 to a value of about 3 to 40 Å, and to set a thickness of rare earth layer 5 to a value of about 2 to 30 Å. It is desirable that a thickness of artificial lattice film which has finally been laminated, namely, recording layer is set to a value of about 50 to 800 Å.

It is desirable that each interface constructing the above artificial lattice film, namely, the interfaces among the first and second Co layers 2 and 4 and the platinum group layer 3 and the interfaces among the first and second Co layers 2 and 4 and the rare earth layer are flat without mutually mixing the atoms in the layers on both sides. However, it is also possible to form a composition modulation structure such that the compositions fluctuate while keeping a predetermined period as a whole although slight disturbances occur in the interfaces. The above artificial lattice film can be formed by sputtering, vacuum evaporation deposition, molecular beam epitaxy (MBE), or the like.

On the other hand, various kinds of elements can be also added in order to raise the thermal stability, to change a Curie temperature, or the like. For instance, as an element to be added into each of the Co layers, it is preferable to use at least one kind selected from B, C, Al, Si, P, Ti, V, Fe, Ni, Cu, Ga, Ge, Zr, Nb, Mo, In, Sn, and Sb. As elements which are added into the platinum group layer, in addition to the elements similar to those in each Co layer, there can be mentioned Cr, Mn, Co, Zn, Y, Rh, Ag, La, Nd, Sm, Eu, Ho, Hf, W, Ir, Au, Pb, Bi, and the like.

In the case of using the above artificial lattice film as a recording layer of the magnetooptic recording medium, the recording layer is generally formed on a transparent substrate. In this case, protecting layers using a metal, a semimetal, a semiconductor, or a dielectric material can be provided on both sides of the recording layer.

Figure 2:
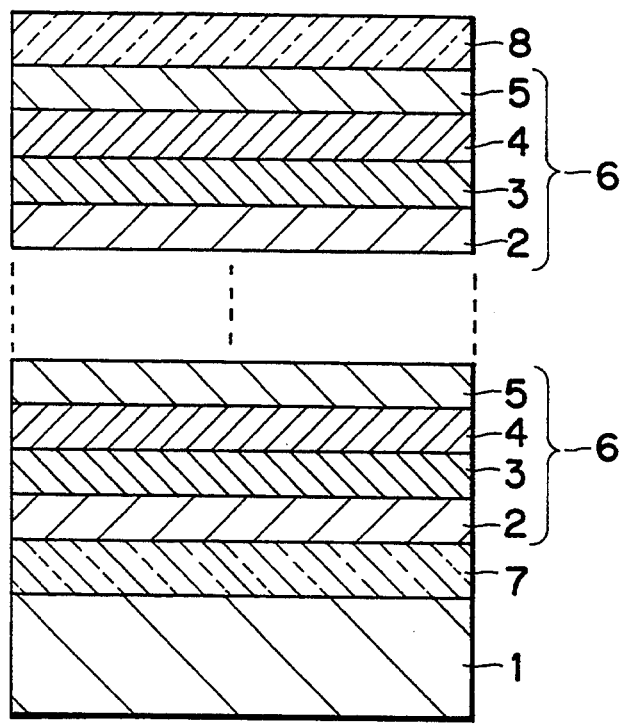
FIG. 2 is a schematic cross sectional view showing a second embodiment of a magnetooptic recording medium of the invention.

FIG. 2 is a schematic cross sectional view showing a second embodiment of the invention in which such protecting layers are provided. In FIG. 2, the same component elements as those shown in FIG. 1 are designated by the same reference numerals and their detailed descriptions are omitted here.

The second embodiment differs from the first embodiment with respect to a point that a first protecting layer 7 is provided between a recording layer which is constructed by periodically laminating a fundamental unit 6 and the substrate 1 and a second protecting layer 8 is provided on the recording layer. A metal, a dielectric material, a semimetal, a semiconductor, or the like can be used as materials of the protecting layers 7 and 8.

When a metal material is used as protecting layers, it is preferable to provide a film having a thickness of 5 to 500 Å and made of Cu, Rh, Pd, Ag, Ir, Pt, or Au having a face-centered cubic structure or a film having a thickness of 5 to 500 Å and made of W or the like having a body-centered cubic structure. In case of using a dielectric material, it is preferable to provide a film having a thickness of 5 to 5000 Å and made of an oxide system compound such as $Al_2O_3$, $Ta_2O_5$, $MgO$, $SiO_2$, $Fe_2O_3$, $ZrO_2$, $Bi_2O_3$, or the like, a nitride system compound such as $ZrN$, $TiN$, $Si_3N_4$, $AlN$, $AlSiN$, $BN$, $TaN$, $NbN$, or the like, etc. In case of using a semimetal or a semiconductor, it is desirable to provide a film having a thickness of 5 to 5000 Å and made of Si, Ge, ZnSe, SiC, ZnS, or the like.

Figure 3:
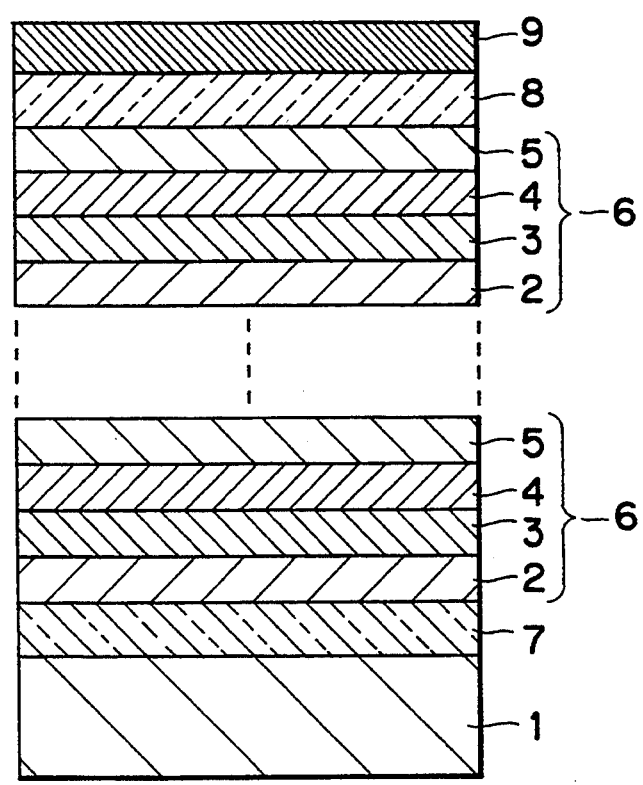
FIG. 3 is a schematic cross sectional view showing a third embodiment of a magnetooptic recording medium of the invention.

Further, in addition to the above recording layer and protecting layers, a layer having a high reflectance can be also provided. FIG. 3 is a schematic cross sectional view showing a third embodiment of the invention having such protecting layers. In FIG. 3, the same component elements as those shown in FIG. 2 are designated by the same reference numerals and their detailed descriptions are omitted here.

The third embodiment differs from the second embodiment with respect to a point that a reflecting layer 9 is further provided on the second protecting layer 8. For instance, when the recording layer is formed by a super thin film of 200 Å or less, most of the incident light is transmitted through the recording layer. Generally, since the light for recording and reading out enters from the side of the substrate made of a transparent material, by providing the reflecting layer on the side opposite to the recording layer when it is seen from the substrate side, the magneto-optical effect of the light which is transmitted through the recording layer can be sufficiently used. A proper metal can be used as such a reflecting layer.

A structure which is formed by sequentially laminating the first Co layer, platinum group layer, second Co layer, and rare earth layer as mentioned above is used as a fundametnal unit. An artificial lattice film is formed by laminating a plurality of such fundamental units. A magnetooptic recording medium is formed by using such an artificial lattice film. As will be obviously understood from Examples, which will be explained hereinlater, such a magnetooptic recording medium has a large coercive force and a larger vertical magnetic anisotropy in a wide film forming range as compared with those of the conventional artificial lattice film of the Pt-Co system or Pd-Co system.

Examples of the invention will now be described with reference to Comparison examples and numerical values.

EXAMPLE 1

Targets of Co, Pt, and Tb each having a diameter of 3 inches are arranged in a magnetron sputtering apparatus, respectively. Slide glass substrate is arranged at the position which faces those targets. The sputtering is executed under an Ar partial pressure and a condition of a gas pressure of 8 mTorr, thereby forming recording layers made of artificial lattice films onto the slide glass substrate as shown hereinbelow. Samples (Examples 1-1 to 1-4) of the magnetooptic recording medium are formed.

Sputtering processes are simultaneously performed under conditions such that a DC electric power of 0.1 A - 300 V is applied to the Co target (first target) and a DC electric power of 0.15 A - 300 V is applied to the Pt target (second target) and a high frequency electric power of 25 W is applied to the Tb target (third target). By alternately opening and closing shutter plates provided over those targets, artificial lattice films using fundamental units each comprising the first to fourth layers are formed on the slide glass substrates. The first layer corresponds to the first Co layer. The second layer corresponds to the platinum group layer. The third layer corresponds to the second Co layer. The fourth layer corresponds to the rare earth layer. Film thicknesses of those first to fourth layers and a total film thickness of the artificial lattice film as a whole are set as shown in Table 1.

A saturation magnetization (emu/cc), a coercive force (kOe), a magnetic field (kOe) which is necessary to magnetize and saturate in the direction perpendicular to the film surface, and a Kerr rotational angle (°) from the artificial lattice film surface of each of the samples obtained are measured by using a magnetization measuring device (VSM) of the sample vibrating type and a Kerr effect measuring device using a laser beam of a wavelength of 830 nm.

Comparison Example 1

An artificial lattice film using a fundamental unit comprising only the first and second layers is formed and samples of the magnetooptic recording medium are formed as Comparison examples 1-1 to 1-3. These Comparison examples correspond to the magnetooptic recording media each of which is made of the conventional artificial lattice film (fundamental unit comprises two layers) of the Co-Pt system. Various kinds of magnetic characteristics are also similarly measured with respect to Comparison examples 1-1 to 1-3. The results are shown in Table 1.

From the results of Examples 1-1 to 1-4 and Comparison examples 1-1 to 1-3 mentioned above, it will be understood that in case of the sample of the conventional Co-Pt system of each Comparison example, the coercive force is small to be 0.1 to 0.2 kOe and the magnetization component in the in-plane direction is large, so that each of the conventional samples cannot be considered to be a good vertical mangetization film. On the other hand, in case of the samples of Examples 1-1 to 1-4, it will be understood that the coercive force is large and the in-plane magnetization component decreases, so that a good vertical magnetization film is obtained.

TABLE 1

| | Compositions and film thickness of each layer in fundamental unit (Å) | | | | Total film thickness (Å) | Saturation magnetization (emu/cc) | | Coercive force (kOe) | Saturation magnetic field in vertical direction (kOe) | Kerr rotational angle (°) | Remarks |
|---|---|---|---|---|---|---|---|---|---|---|---|
| | First layer | Second layer | Third layer | Fourth layer | | Vertical | In-plane | | | | |
| Example 1-1 | Co 5 | Pt 12 | Co 5 | Tb 3 | 400 | 250 | 20 | 1.2 | 1.8 | 0.20 | |
| Example 1-2 | Co 10 | Pt 17 | Co 7 | Tb 3 | 185 | 340 | 25 | 0.9 | 1.5 | 0.25 | |
| Example 1-3 | Co 2 | Pt 8 | Co 5 | Tb 2 | 306 | 200 | 70 | 0.8 | 2.0 | 0.18 | |
| Example 1-4 | Co 10 | Pt 20 | Co 20 | Tb 15 | 390 | 350 | 80 | 0.8 | 2.1 | 0.15 | |
| Comparison example 1-1 | Co 5 | Pt 12 | — | — | 340 | 370 | 150 | 0.2 | 1.7 | 0.20 | |
| Comparison example 1-2 | Co 2 | Pt 5 | — | — | 147 | 250 | 100 | 0.15 | 1.6 | 0.22 | |
| Comparison example 1-3 | Co 10 | Pt 20 | — | — | 150 | 330 | 280 | 0.1 | 2.4 | 0.18 | |

EXAMPLE 2

Comparison Example 2

Samples (Examples 2-1 and 2-2 and Comparison examples 2-1 to 2-7) are formed in a manner similar to Example 1 and Comparison example 1 while changing the materials which are arranged for the targets, film thicknesses of layers, and the like as shown in Table 2. The samples formed are also evaluated in a manner similar to Example 1 and Comparison example 1 mentioned above. The results are also shown in Table 2. "in-plane" in "Remarks" in Table 2 denotes that the sample becomes an in-plane magnetic anisotropic film. In each of Examples 2-1 and 2-2, the fundamental unit comprises four layers and has a construction of the magnetooptic recording medium of the invention. In each sample of Comparison examples 2-1 to 2-7, the fundamental unit comprises two or three layers and those samples are out of the purview of the invention.

In case of Examples 2-1 and 2-2, it will be understood that a coercive force increases and a magnetization component in the in-plane direction decreases, that is, the vertical magnetic anisotropy is improved as compared with Comparison examples 2-1 and 2-2 corresponding to Examples 2-1 and 2-2. On the other hand, Comparison examples 2-3 and 2-4 relate to the samples in which rare earth elements which are used in the invention are added to the Co layer of the conventional artificial lattice film of the Co-Pd system. However, the samples of Comparison examples 2-3 and 2-4 are the in-plane anisotropic films. The samples of Comparison examples 2-5 and 2-6 are formed by adding rare earth elements which are used in the invention into the Pd layer of the conventional artificial lattice film of the Co-Pd system and become the in-plane anisotropic films. In Comparison example 2-7, the fundamental unit of the artificial lattice film comprises three layers which are formed by sequentially laminating the Co layer, platinum group layer, and rare earth layer. However, in such a construction, the sample of comparison example 2-7 is also the in-plane magnetic anisotropic film.

TABLE 2

| | Compositions and film thickness of each layer in fundamental unit (Å) | | | | Total film thickness (Å) | Saturation magnetization (emu/cc) | | Coercive force (kOe) | Saturation magnetic field in vertical direction (kOe) | Kerr rotational angle (°) | Remarks |
|---|---|---|---|---|---|---|---|---|---|---|---|
| | First layer | Second layer | Third layer | Fourth layer | | Vertical | In-plane | | | | |
| Example 2-1 | Co 4 | Pd 10 | Co 4 | Dy 4 | 176 | 350 | 40 | 2.5 | 3.0 | 0.24 | |
| Comparison example 2-1 | Co 4 | Pd 10 | — | — | 168 | 550 | 130 | 0.9 | 2.8 | 0.21 | |
| Example 2-2 | Co 3 | $Pt_{50}Pd_{50}$ 8 | Co 5 | $Gd_{50}Tb_{50}$ 3 | 475 | 250 | 40 | 2.8 | 3.2 | 0.22 | |
| Comparison example 2-2 | Co 3 | $Pt_{50}Pd_{50}$ 8 | — | — | 473 | 470 | 120 | 0.4 | 1.8 | 0.17 | |
| Comparison example 2-3 | $Co_{70}Dy_{30}$ 4 | Pd 10 | — | — | 168 | 210 | 350 | 0.1 | 2.5 | 0.02 | In-plane |
| Comparison example | $Co_{50}Dy_{50}$ 4 | Pd 10 | — | — | 168 | 180 | 350 | 0.1 | 2.5 | 0.02 | In-plane |

TABLE 2-continued

| | Compositions and film thickness of each layer in fundamental unit (Å) | | | | Total film thickness (Å) | Saturation magnetization (emu/cc) | | Coercive force (kOe) | Saturation magnetic field in vertical direction (kOe) | Kerr rotational angle (°) | Remarks |
|---|---|---|---|---|---|---|---|---|---|---|---|
| | First layer | Second layer | Third layer | Fourth layer | | Vertical | In-plane | | | | |
| 2-4 Comparison example 2-5 | Co 4 | $Pd_{90}Dy_{10}$ 5 | — | — | 168 | 50 | 700 | — | 15kOe or more | 0 | In-plane |
| Comparison example 2-6 | Co 5 | $Pt_{90}Dy_{10}$ 12 | — | — | 168 | 50 | 750 | — | 15kOe or more | 0 | In-plane |
| Comparison example 2-7 | Co 4 | Pd 10 | Dy 4 | — | 162 | 20 | 750 | — | 15kOe or more | 0 | In-plane |

It is known that the reason why the conventional artificial lattice films of the Co-Pt system and Co-Pd system exhibit the vertical magnetic anisotropy is because the film depends on an influence force such as coupling between the atoms in the interface between the Co layer and the Pt or Pd layer, stress distortion in the interface, or the like. It is also known that when a rare earth element is mixed into either one of the layers constructing the conventional artificial lattice film of the Co-Pt system or Co-Pd system or when an intermediate layer made of a rare earth element is inserted between the Co layer and the Pt or Pd layer, the vertical magnetic anisotropy is extinguished. The above phenomena are also shown and will be understood from the results of Comparison examples mentioned above. On the other hand, it is also known that the super thin multi-layer film comprising the Co layer and the rare earth atom layer exhibits a good vertical magnetic anisotropy due to the coupling between the atoms similar to that mentioned above.

With the construction as in the present invention using the fundamental unit comprising four layers in which the first Co layer, platinum group layer made of Pt, Pd, or Pt-Pd alloy, second Co layer, and rare earth layer are laminated, the Co layer and the platinum group layer construct one pair and the Co layer and the rare earth layer also construct another pair. It is expected that a good vertical magnetic anisotropy is obtained without obstructing the vertical magnetic anisotropy which each pair has. As shown in above Examples, a good vertical magnetic anisotropy can be actually obtained.

With respect to the samples of each of Examples of the invention, a test to dip the samples into the saline solution of 0.1 mol/l for three hours and a test to leave the sample for one week under a temperature of 70° C. and a relative humidity of 90% are executed. Consequently, even after completion of those tests, the coercive force, saturation magnetization, Kerr rotational angle, and the like hardly change. It has been found that good corrosion resistance and preservation performance can be expected in case of the magnetooptic recording medium according to the invention. Those tests are executed with respect to the samples in each of which the artificial lattice film is exposed on the substrate without forming a protecting layer or the like.

According to the invention as described above, the fundamental unit is formed by sequentially laminating the first Co layer made of Co, platinum group layer made of metal selected from Pt, Pd, and Pt-Pd alloy, second Co layer made of Co, and rare earth layer made of at least one or more kinds of elements selected from Ce, Pr, Nd, Pm, Sm, Eu, Gd, Tb, Dy, Ho, and Er. The artificial lattice film which is formed by repetitively laminating such fundamental units is used as a recording layer. Consequently, there are advantages such that the coercive force and the vertical magnetic anisotropy are improved and the magnetooptic recording medium having stable characteristics is derived.

What is claimed is:

1. A magnetooptic recording medium comprising:
   a substrate; and
   a recording layer which is provided on said substrate and is comprised of a plurality of laminated fundamental units,
   wherein each of said fundamental units is constructed of
   a first layer consisting essentially of Co,
   a second layer consisting essentially of at least one member selected from the group consisting of Pt and Pd,
   a third layer consisting essentially of Co, and
   a fourth layer consisting essentially of at least one element selected from the group consisting of Ce, Pr, Nd, Pm, Sm, Eu, Gd, Tb, Dy, Ho, and Er,
   each of said first layer, second layer, third layer, and fourth layer being substantially independently provided.

2. A medium according to claim 1, wherein each of said first layer and said third layer has a film thickness in a range of 2 to 30 Å.

3. A medium according to claim 1, wherein said second layer has a film thickness in a range of 3 to 40 Å.

4. A medium according to claim 1, wherein said fourth layer has a film thickness in a range of 2 to 30 Å.

5. A medium according to claim 1, wherein said recording layer has a film thickness in a range of 50 to 800 Å.

7. A medium according to claim 6, wherein at least one element selected from the group consisting of B, C, Al, Si, P, Ti, V, Fe, Ni, Cu, Ga, Ge, Zr, Nb, Mo, In, Sn, and Sb is included within said first layer and said third layer.

6. A medium according to claim 1, wherein at least one element selected from the group consisting of B, C, Al, Si, P, Ti, V, Fe, Ni, Cu, Ga, Ge, Zr, Nb, Mo, In, Sn, Sb, Cr, Mn, Co, Zn, Y, Rh, Ag, La, Nd, Sm, Eu, Ho, Hf, W, Ir, Au, Pb, and Bi is included within said second layer.

8. A medium according to claim 1, further comprising:
   a first protecting layer provided between said substrate and said recording layer; and
   a second protecting layer provided on said recording layer.

9. A medium according to claim 8, wherein each of said first protecting and said second protecting layer is made of a material selected from the group consisting of Cu, Rh, Pd, Ag, Ir, Pt, Au, W, $Al_2O_3$, $Ta_2O_5$, MgO, $SiO_2$, $Fe_2O_3$, $ZrO_2$, $Bi_2O_3$, ZrN, TiN, $Si_3N_4$, AlN, AlSiN, BN, TaN, NbN, Si, Ge, ZnSe, SiC, and ZnS.

10. A medium according to claim 9, wherein each of said first protecting layer and said second protecting layer has a film thickness in a range of 5 to 5000 Å.

11. A medium according to claim 1, further comprising a reflecting layer formed on said recording layer.

12. A medium according to claim 11, wherein said recording layer has a film thickness of 200 Å or less.

* * * * *

UNITED STATES PATENT AND TRADEMARK OFFICE
CERTIFICATE OF CORRECTION

PATENT NO. : 5,370,945
DATED : December 6, 1994
INVENTOR(S) : YOICHI OSATO

It is certified that error appears in the above-indentified patent and that said Letters Patent is hereby corrected as shown below:

ON THE COVER PAGE

[56] REFERENCES CITED

U.S. PATENT DOCUMENTS

"denBroeder et al." should read
--den Broeder et al.--

FOREIGN PATENT DOCUMENTS

```
"198144    4/1989 Japan
 1162257   6/1989 Japan
 3134833   6/1991 Japan
 3157838   7/1991 Japan
 4053044   2/1992 Japan"
``` should read
```
--1-98144    4/1989 Japan
  1-162257   6/1989 Japan
  3-134833   6/1991 Japan
  3-157838   7/1991 Japan
  4-053044   2/1992 Japan"--
```

UNITED STATES PATENT AND TRADEMARK OFFICE
CERTIFICATE OF CORRECTION

PATENT NO. : 5,370,945
DATED : December 6, 1994
INVENTOR(S) : YOICHI OSATO

It is certified that error appears in the above-indentified patent and that said Letters Patent is hereby corrected as shown below:

COLUMN 9

Line 10, "first protecting" should read --first protecting layer--.

Signed and Sealed this

Twenty-seventh Day of June, 1995

Attest:

BRUCE LEHMAN

Attesting Officer     Commissioner of Patents and Trademarks